United States Patent Office 2,948,500
Patented Aug. 9, 1960

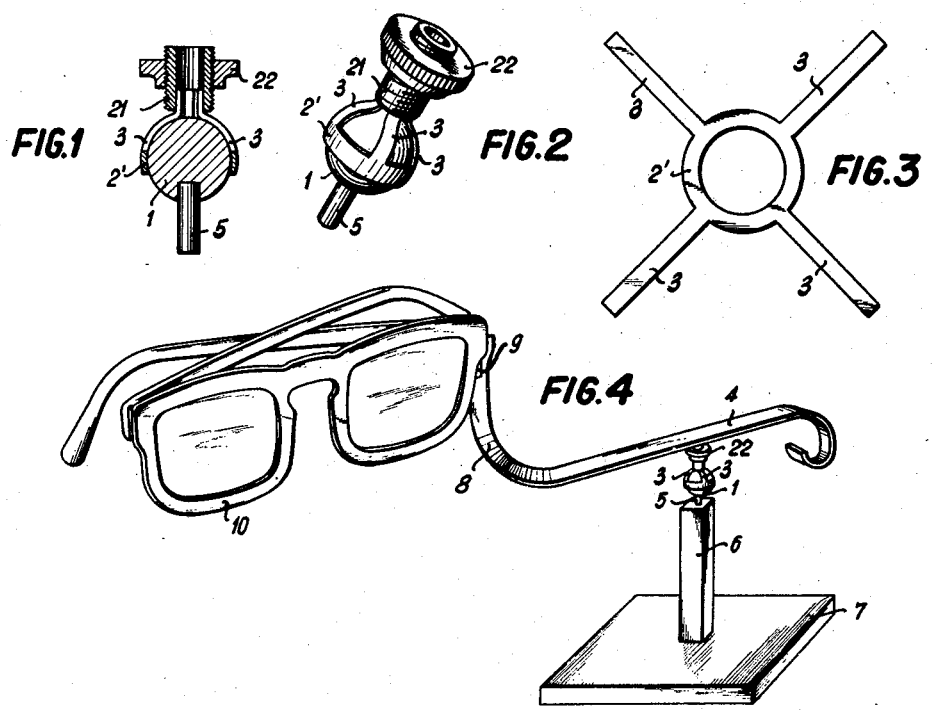

2,948,500

DEVICE FOR CARRYING ARTICLES ON DISPLAY

Emil Kühn, 23 Azenbergstrasse, Stuttgart, Germany

Filed Feb. 29, 1956, Ser. No. 568,655

Claims priority, application Germany Jan. 17, 1956

3 Claims. (Cl. 248—122)

The present invention relates to devices for placing articles on display, such devices being adapted to be used, for example, in show windows and the like.

One of the objects of the present invention is to provide a structure capable of holding an article on display and being adjustable through an extremely wide range so that any desired position of the article on display may be provided.

A further object of the present inevntion is to provide a structure capable of supporting a plurality of related articles on display in a predetermined relationship with respect to each other.

An additional object of the present invention is to provide a device of the above type which has an adjusting structure characterized by great simplicity and low cost of manufacture as well as great convenience in use and reliability in operation.

With the above objects in view, the present invention mainly consists of a device for carrying eye glasses or the like on display, comprising, in combination, a base member, an elongated supporting member extending upwardly from the base member, a single strip-shaped attaching member, ball joint means for turnably connecting the strip-shaped attaching member to the upper end of the supporting member, the attaching member being formed with a slot spaced from the ball joint means and eye glasses having a portion not visible from the front thereof mounted in the slot.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevational view of an embodiment of a joint according to the present invention, the section of Fig. 1 being taken through a central axis of the joint;

Fig. 2 is a perspective view of the joint of Fig. 1;

Fig. 3 is a plan view of a blank which is formed into the embracing member of the joint of Figs. 1 and 2;

Fig. 4 is a perspective view of a display device according to the present invention shown as it is used to display spectacles.

The joint which is illustrated in Figs. 1 and 2, and which is used in the embodiment of Fig. 4, includes a ball member 1 having a pin 5 fixed thereto and extending radially therefrom. The embracing member of the joint is made up of a ring 2' having a plurality of arms 3' extending radially therefrom. The ring 2' has an inner diameter corresponding substantially to the outer diameter of the ball member 1 and surrounds the latter in the manner shown in Figs. 1 and 2. The arms 3' extend from the ring 2' and form with the latter a basket-like embracing member which encloses more than half of the ball member 1. The free ends of the arms 3' are bent in the manner indicated in Fig. 1 and are located closely adjacent to each other. These free ends are inserted into a threaded sleeve 21, and the arms 3' are hard soldered to the threaded sleeve 21, or they are fixed to the latter in any other suitable manner. A nut 22 threadedly engages the outer threaded surface of the sleeve 21. With this arrangement it is possible to turn the nut 22 down into engagement with the arms 3' to press the latter tightly against the outer surface of the ball member 1, and thus it is possible with the nut 22 and the sleeve 21 to fix the joint in an adjusted position.

Fig. 3 shows the shape of a blank bent from resilient sheet metal or the like and used to form the embracing member of the joint shown in Figs. 1 and 2. This blank is bent to the form shown in Figs. 1 and 2 with a suitable die arrangement, and then the free ends of the arms 3' are joined to the threaded sleeve 21 in the manner described above, after the ball member 1 has been inserted into the embracing member. It should be noted that with this embodiment the die engages only the outer surface of the embracing member, and the ball member 1 serves itself as the inner die, the embracing member being bent directly onto the ball member 1. Before the ring 2' assumes its final shape it is in the form of a short cylindrical tube, and when the ring 2' is placed in the die together with the ball member 1 this ring 2' is transversely curved to correspond to the curvature of the outer surface of the ball member 1. In this manner the ball member 1 and the embracing member 2', 3' are joined to each other and it is evident that the connection is permanent since the embracing member cannot be removed from the ball member without being deformed. Thus, it is impossible for one of the joint members to be separated from the other joint member and to be lost.

According to the invention illustrated in Fig. 4, the embracing member of the joint is joined to a means for carrying the article to be displayed, this means being in the form of a single elongated strip-shaped attaching member 4 of substantially S-shape. The end of the threaded sleeve 21 which is distant from the arms 3' is soldered or otherwise fixed to the strip 4 intermediate the ends of the latter. The pin 5 which is fixed to the ball member 1 is inserted into a bore formed in a column 6b and extending downwardly from the upper face thereof. This column 6b, an elongated supporting member, is connected, preferably removably, in any suitable way to a support plate 7', forming a base member. The upwardly extending free end portion 8 of the metallic strip 4 is formed with a slot 9 into which is inserted the joint between the front frame of a pair of spectacles 10 and one of its side pieces. This slot 9 extends downwardly from the top edge of the strip 4, the width of the slot is decreasing in the direction of one end portion towards the other end portion of the attaching member, and the joint at the right side of the spectacles 10 is simply pushed down into the slot 9, this slot 9 having such a width that the joint of the spectacles is frictionally engaged by the strip 4 so that the latter carries the spectacles in the manner illustrated in Fig. 4. Through the medium of the ball joint shown in Fig. 4 the strip 4 may be turned to any desired position so as to place the spectacles in the best possible position for display. Because of the narrowness of the strip 4 and because of the form of its outer surface, which may be chromed, for example, the carrying means formed by the strip 4 does not engage the attention of the observer and remains completely in the background so that the details of the spectacle frame attract the attention of the observer. Furthermore, the portion of the eye glasses mounted in the slot 9 is not visible from the front.

It will be understood that each of the elements described above, or two or more together, may also find a useful application in other types of display devices differing from the types described above.

While the invention has been illustrated and described as embodied in adjustable display devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for carrying eye glasses or the like on display, comprising, in combination, a base member; an elongated supporting member extending upwardly from said base member; a single-strip-shaped attaching member; ball joint means for turnably connecting said strip-shaped attaching member to the upper end of said supporting member, said attaching member being formed with a slot spaced from said ball joint means; and eye glasses having a portion not visible from the front thereof mounted on said slot.

2. A device for carrying eye glasses or the like on display, comprising, in combination, a base member; an elongated supporting member extending upwardly from said base member; a single-strip-shaped attaching member; ball joint means for turnably connecting the center portion of said strip-shaped attaching member to the upper end of said supporting member, said attaching member being formed with a longitudinal slot located in one end portion thereof; and eye glasses having a portion not visible from the front thereof mounted on said slot.

3. A device for carrying eye glasses or the like on display, comprising, in combination, a base member; an elongated supporting member extending upwardly from said base member; a single-strip-shaped attaching member; ball joint means for turnably connecting one end portion of said strip-shaped attaching member to the upper end of said supporting member, said attaching member being formed with a longitudinal slot located in the other end portion thereof, the width of said slot decreasing in the direction from said one end portion towards said other end portion of attaching member; and eye glasses having a portion not visible from the front thereof mounted on said slot.

References Cited in the file of this patent

UNITED STATES PATENTS

| | | |
|---|---|---|
| 135,771 | Burtch | Feb. 11, 1873 |
| 249,125 | Vossler | Nov. 1, 1881 |
| 363,525 | Lipp | May 24, 1887 |
| 719,574 | Fergusson | Feb. 3, 1903 |
| 1,186,428 | Newman | June 6, 1916 |
| 1,220,069 | Capdevila | Mar. 20, 1917 |
| 1,290,755 | Jones | Jan. 7, 1919 |
| 1,661,207 | Weaver | Mar. 6, 1928 |
| 1,971,519 | Bradford | Aug. 28, 1934 |
| 2,764,286 | Carmichael | Sept. 25, 1956 |